United States Patent
Doyle

(10) Patent No.: US 7,370,674 B2
(45) Date of Patent: May 13, 2008

(54) MODULAR FLUID DISTRIBUTION SYSTEM

(76) Inventor: Michael Doyle, 10001 Timothy La., Villa Park, CA (US) 92861

( * ) Notice: Subject to any disclaimer, the term of this patent is extended or adjusted under 35 U.S.C. 154(b) by 0 days.

(21) Appl. No.: 11/063,126

(22) Filed: Feb. 19, 2005

(65) Prior Publication Data

US 2006/0185746 A1     Aug. 24, 2006

Related U.S. Application Data

(60) Provisional application No. 60/546,612, filed on Feb. 20, 2004.

(51) Int. Cl.
*F16K 11/10*      (2006.01)
(52) U.S. Cl. .................... 137/884; 285/305
(58) Field of Classification Search ............ 137/884; 285/124.4, 124.5, 305
See application file for complete search history.

(56) References Cited

U.S. PATENT DOCUMENTS

| | | | |
|---|---|---|---|
| 2,597,482 A * | 5/1952 | Harrison et al. ............ 285/305 |
| 3,234,963 A * | 2/1966 | Lyon ........................ 137/884 |
| 3,506,029 A * | 4/1970 | Demler, Sr. et al. .... 137/561 R |
| 3,538,940 A * | 11/1970 | Graham ..................... 137/271 |
| 3,560,027 A * | 2/1971 | Graham ................... 285/130.1 |
| 3,563,265 A * | 2/1971 | Graham ..................... 137/269 |
| 3,735,928 A * | 5/1973 | Watts et al. ................ 285/305 |
| 4,782,852 A * | 11/1988 | Legris ........................ 137/269 |
| 5,092,300 A * | 3/1992 | Imoehl et al. .............. 123/469 |
| 5,704,399 A * | 1/1998 | Hayashi et al. ............. 137/884 |
| 6,135,155 A * | 10/2000 | Ohmi et al. ................ 137/884 |
| 6,546,960 B1 * | 4/2003 | Rohrberg et al. ........... 137/884 |
| 6,568,713 B1 * | 5/2003 | Bruvry et al. ......... 285/133.21 |
| 6,634,385 B2 * | 10/2003 | Symington .................. 137/884 |
| 6,733,044 B2 * | 5/2004 | Huang ..................... 285/124.1 |
| 6,769,463 B2 * | 8/2004 | Vu .............................. 141/98 |
| 6,832,788 B2 * | 12/2004 | Fukano et al. .......... 285/124.5 |
| 6,929,032 B2 * | 8/2005 | Rehder et al. .............. 137/884 |
| 7,168,451 B1 * | 1/2007 | Dundas ..................... 285/305 |
| 7,178,556 B2 * | 2/2007 | Reid et al. .................. 137/884 |

\* cited by examiner

*Primary Examiner*—John Fox
(74) *Attorney, Agent, or Firm*—Aaron McGushion

(57) ABSTRACT

An interconnection assembly for the transport of a fluid between an external fluidic means and a mounting block of a modular fluid distribution system, comprising: a cylindrical cavity formed through a face of the mounting block; a cylindrical flow element, a fluid passage formed therethrough, at least one retaining groove being formed on the outer surface; a retaining means; wherein the cylindrical flow element is inserted into the cylindrical cavity, the annular sealing means being compressed, the annular sealing means forming a hermetic seal between the fluid passage and the fluid port, the retaining means engaging retaining groove, the retaining means being braced against the mounting block; and wherein said fluid is transported between said external fluidic component and said mounting block via said cylindrical flow element.

2 Claims, 9 Drawing Sheets

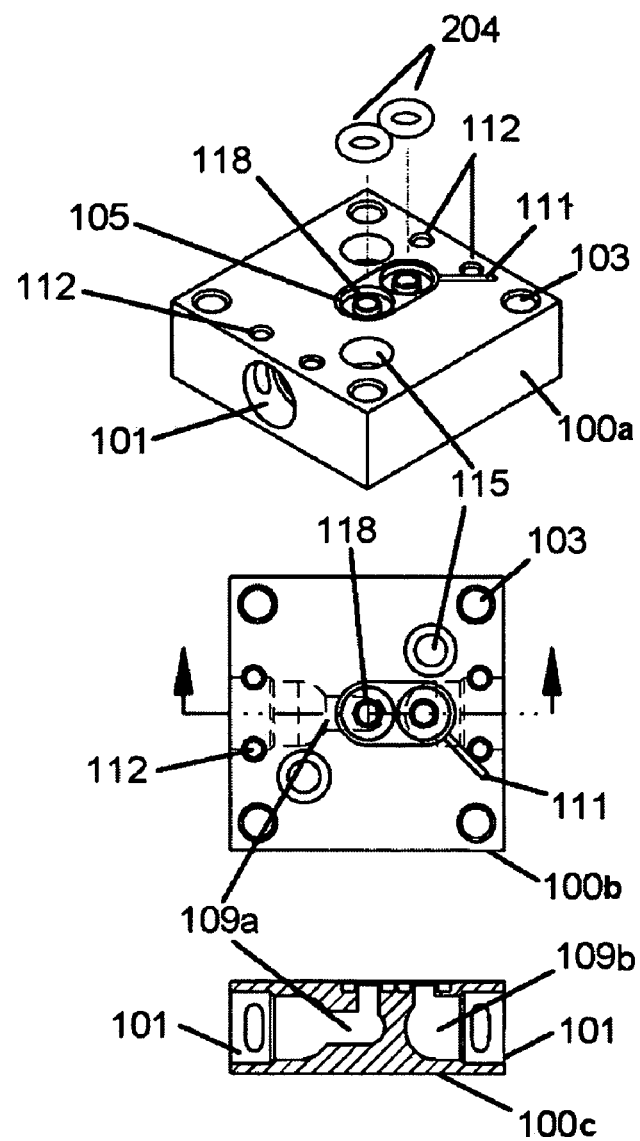
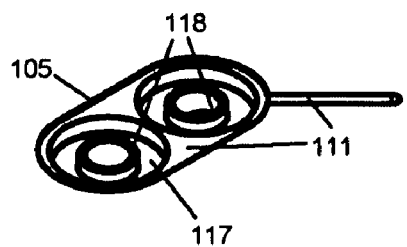
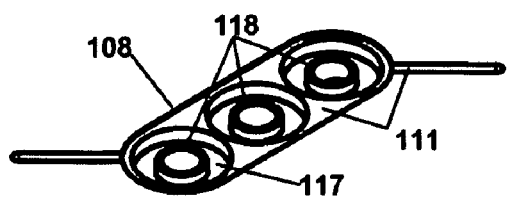
FIG. 4
FIG. 5          FIG. 6

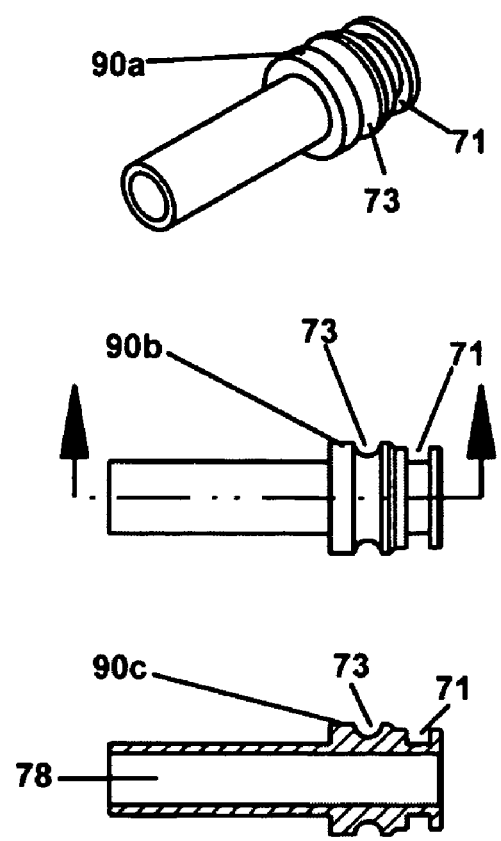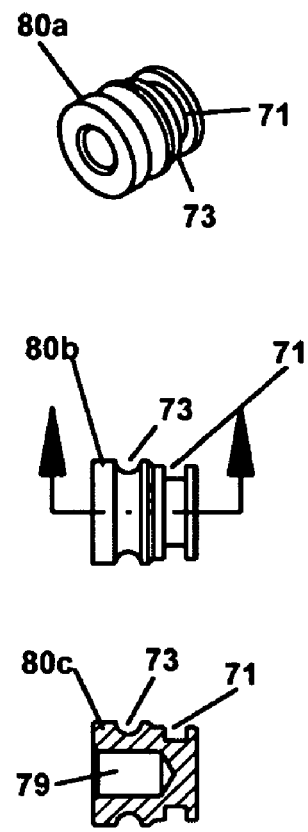
FIG. 9
FIG. 10

MODULAR FLUID DISTRIBUTION SYSTEM

CROSS-REFERENCE TO RELATED APPLICATIONS

This application is entitled to the benefit of Provisional Application for Patent Ser. No. 60/546,612 filed on Feb. 20, 2004.

BACKGROUND OF THE INVENTION

This invention relates generally to fluid control systems. More particularly, this invention relates to a modular mounting system for chemical fluid control components of a chemical fluid control system.

Fluid control components are used to control the delivery of a fluid (i.e., a gas or liquid) in industrial processes. These components are arranged so that fluid is carried through each of the components. Chemical delivery systems are used in numerous industries to control the flow of fluids, including gas reactants and other chemicals (e.g., liquids). In general, process control of fluid production requires the selection, conditioning, and metering of specific fluids, which are then routed to analytical equipment. The fluid control system is known as a sampling system, reflecting its main function of drawing a small portion of the main fluid being produced and returning it the main stream after analysis is complete.

In the production of petrochemicals, a fluid is sampled on demand and analyzed to identify the presence and quantity of its constituents. This sampling analysis is used as process control in a feedback manner to keep desired results constants.

In other industries, it is required that a mixture of precisely metered amounts of chemicals be delivered to a reactor vessel. A variety of fluid control components are configured to control the delivery of various fluids during processing. In these industries the fluid control system is known as a gas panel containing a plurality of gas sticks, or components linked together to process each gas species or constituent.

Filtering, pressure regulation, flow metering, valving, and other flow control functions are needed to design a fluid flow control systems. It is common practice to link discrete components performing each of these functions using piping and fluid connectors. Most of these systems require custom design, welding, and machining. FIG. 1 illustrates an existing fluid control assembly 20. The fluid control assembly 20 includes a set of fluid control components joined by multiple welds and fittings. One fluid-control component depicted in FIG. 1 is a shut-off valve 22. A pipe section 26 links the shut-off valve 22 to a sleeve or fitting 28 associated with a pressure regulator 24. The pressure regulator 24 has a fitting 30 on its opposite side for connection with a pipe section 32. Pipe section 32 is connected to a fitting 36 associated with a pressure transducer 34. The opposite side of the pressure transducer 34 also has a fitting 38 for connection with another pipe section. Check valve 40 is connected to fitting 38, followed by component 42, mass flow controller 44, and finally valve 46. The fluid control assembly 20 is attached to a substrate 50.

Those skilled in the art recognize a number of problems associated with prior art gas sticks of the type illustrated in FIG. 1. First, the multiple fittings and pipe sections need to be welded or otherwise secured to one another. The assembly of these components can be relatively labor intensive. Similarly, the disassembly of these components for repair or replacement can be labor-intensive and costly.

Another problem associated with fluid control assembly is that the numerous fittings and pipe sections produce a relatively long and heavy device. The attachment of the fluid control assembly to a substrate also produces problems since the entire fluid assembly must be removed from the substrate in order to repair the gas stick.

In addition, for each part of the substrate assembly, a distinctly different substrate component is often required for each type of function required for the process. This forces the user to purchase many different types of fluid control components in preparation for multiple options at the time of assembly. This increases the amount of in-house stock required for daily operation, resulting in higher operation costs and an increase in the complexity of the assembled system.

Another problem experienced with existing systems is the inability to purge individual components and fluid passages without purging the surrounding components and fluid passages. Purging is necessary when dealing with reactive chemicals that need to be removed from the system before introducing an additional fluid.

Additionally, when face seal or compression-type fittings are utilized to connect the various fluid control components, undesirable torque can be transmitted throughout the gas stick. The operator can "chase" a leak in the gas stick by tightening one fitting, only to find that the resulting torque has loosened another fitting, causing it to leak. This process is lengthy and often ineffective.

What is needed is a fluid control system that is relatively easy to configure and assemble, lightweight, minimizes the required number of parts, does not substantially transmit torque throughout the system, allows for purging between sticks, allows purging of specific component assemblies while avoiding surrounding components, and requires no welding for assembly.

SUMMARY OF THE INVENTION

An interconnection assembly for the transport of a fluid between a plurality of mounting blocks of a modular fluid distribution system comprising:

a plurality of cylindrical cavities, the cylindrical cavities being formed through a plurality faces of a first mounting block and a second mounting block, each of the cylindrical cavities having a wall and a bottom, a fluid port being formed at the bottom of each the cylindrical cavities;

a cylindrical flow element, a fluid passage being formed through an axis of the cylindrical flow element, the cylindrical flow element having a first terminus and a second terminus, an annular retaining groove being formed on the outer surface of each the first terminus and the second terminus, an annular sealing groove being formed on the outer surface of each the first terminus and the second terminus;

an annular sealing means, the annular sealing means being made of an elastomer material, one of the annular sealing means being seated in each the annular sealing groove formed on the first terminus and the second terminus;

a plurality of retaining pins, the retaining pins being inserted through a corresponding plurality of holes formed in the first mounting block and the second mounting block, the annular retaining groove of the first terminus being configured to receive the retaining pins when the first terminus of the cylindrical flow element is inserted into the cylindrical cavity of the first mounting block, the annular retaining groove of the second terminus being configured to receive the retaining pins when the second terminus of the cylindrical flow element is inserted into the cylindrical cavity of the second mounting block;

wherein the annular sealing means being compressed between the wall of the cylindrical cavity and the annular sealing means, the annular sealing means forming a hermetic seal between the first mounting block, the fluid passage of the cylindrical flow element, and the second mounting block;

and wherein the retaining pins means preventing substantial disengagement of the cylindrical flow element from the cylindrical cavity, the retaining pins preventing substantial transmission of torque between the first mounting block and the second mounting block;

and wherein the fluid is transported between the first mounting block and the second mounting block via the cylindrical flow element, one the cylindrical flow element coupling the first mounting block to the second mounting block.

The present invention provides a unique means to quickly connect two adjacent mounting blocks within a modular fluid distribution system. Fluid is introduced into the system through a standard industry connector formed into one end of the cylindrical flow element. The opposite end of this cylindrical flow element is inserted into a cylindrical cavity on a lateral or bottom face of the mounting block.

This cylindrical cavity is designed for receiving and forming a hermetic connection with the cylindrical flow element using the annular sealing means made of a suitable compressive medium such as elastomer material, for the purpose of transporting a fluid from the cylindrical flow element to the mounting block. The annular sealing means can be any suitable seal, such as an o-ring, and the like.

The o-ring can be situated in various configurations, to allow a hermetic seal to be formed between the cylindrical flow element and the mounting block. A boss can be formed at the terminus of the cylindrical flow element, the boss being configured to receive the o-ring. As the cylindrical flow element is inserted into the cylindrical cavity, the o-ring is compressed between the cylindrical flow element and the cylindrical cavity, forming a leak tight seal. Other standard o-ring sealing configurations are additionally available.

It is desirable to keep the cylindrical flow elements secured in their corresponding cylindrical cavity. In the preferred approach, the cylindrical flow elements are kept from disengaging by the retaining means, such as locking or keying dowel pins, or the like. The dowel pins are inserted through the mounting block substantially normal to the central axis of the cylindrical flow element, a concentric retaining groove is formed in the cylindrical flow element, receiving the pin, locking the cylindrical flow element in the cylindrical cavity.

No substrate is necessary to maintain engagement between the cylindrical flow element and the mounting block. As opposed to existing technology, that utilizes fasteners to engage and hold adjacent mounting blocks together on a substrate, the present invention relies on dowel pins or similar technology to retain engagement and hold mounting blocks in an adjacent relationship.

An additional benefit of the retaining means is the minimization of transferred torque from one part of a modular fluid distribution system to another. The cylindrical flow element is not substantially prevented from axially rotating about the axis of the cylinder. Therefore, torque cannot be transmitted through the connection to a significant degree.

The interconnection assembly of the present invention is used within the construction of more complex modular fluid distribution systems of two or more mounting blocks connected to one another by cylindrical flow elements or a direct connection from port to port, through a seal. The mounting blocks are generally comprised of: a mounting face, a bottom face, and a plurality of lateral faces, the mounting face being configured to receive a mounted fluidic control component; a first cylindrical cavity; a second cylindrical cavity; a first port, the first port formed in the mounting face, the first port being configured to receive a first gasket; a second port, the second port formed in the mounting face; the second port being configured to receive a second gasket; a first fluid passage, the first fluid passage fluidly communicating between the first cylindrical cavity and the first port; a second fluid passage, the second fluid passage fluidly communicating between the second cylindrical cavity and the second port.

A single fluidic control component assembly can be created comprising, a first fluidic control component is mounted on said mounting face, the first fluidic control component having a fluid inlet and a fluid outlet, the inlet being hermetically connected with the first port, the first gasket being compressively interposed; the outlet being hermetically connected with the second port, the second gasket being compressively interposed; and wherein a fluid is introduced into the cylindrical flow element installed in the first cylindrical cavity, flowing through the first passage, into the first port, being conditioned by the first fluidic control component, entering the second port, flowing through the second passage, exiting through a second cylindrical flow element installed in the second cylindrical cavity.

A dual fluidic control component assembly can be further created comprising, a second fluidic control component being mounted on a second mounting face of a second mounting block, said second cylindrical flow element having a secondary terminus installed in a third cylindrical cavity formed in said second mounting block, said second mounting block being generally similar to said mounting block, and wherein said fluid is received from said second cylindrical flow element, flowing through a third passage of said second mounting block, into a third port, being conditioned by said second fluidic control component, entering a fourth port, flowing through a fourth passage, exiting through a third cylindrical flow element installed in said fourth cylindrical cavity.

More than two mounting blocks with a fluidic control component mounted on each, can be joined using the cylindrical flow elements of the present invention in a manner similar to that described above. A plurality of component mounting blocks and fluid control components can be assembled in this way, forming an array of fluidic control components, all interconnected using a standardized set of mounting blocks and cylindrical flow elements, without utilizing welds or other permanent fusing means. The first and the last component mounting blocks in the array may have tubular elements that incorporate industry standard connectors at one terminus for inlet and outlet of fluid from the system.

In another aspect of the invention, a mounting block may contain a port at the bottom face for access to a second level of interconnection between component arrays that may not be immediately adjacent to each other. In this case, a fluid passage from one of the ports on the top of the mounting block is routed to a port on the bottom face of the mounting block for routing to a second level mounting block, thereafter routing the fluid to nonadjacent mounting blocks using a cylindrical flow element.

The mounting block further comprising: at least one bottom port, the bottom port formed in the bottom face, the bottom port being configured to receive a bottom gasket; the bottom port being configured to hermetically connect with a port of an adjacent mounting block, the bottom gasket being compressively interposed.

All blocks incorporate two mounting holes on the top face that allow the use of fasteners to affix the blocks to a mounting plate, directly or through spacers. The mounting plate may be heated, as it may be required in humid environments where condensation may take place. Heating may be provided through the use of standard heating elements, or the like. The modular fluid distribution system is built with mounting blocks containing fluid passages and interconnecting cylindrical flow element. The mounting blocks are placed over a base plate which serves as structural support with the cylindrical flow elements being used to route fluid from mounting block to mounting block.

In a additional approach, component mounting blocks may have cylindrical cavities for interconnection to other component mounting blocks on more than just two lateral faces allowing the distribution of one fluid to from one component mounting block to multiple component mounting blocks as well as the receipt of fluids by one component mounting block from multiple component mounting blocks from various directions. Each of the four lateral faces may have a cylindrical cavity formed therein, as dictated by the intended application.

Additionally, if one or more of the cylindrical cavities were not needed in an application, a plugging means may be employed. The cylindrical flow element having retaining grooves formed at a first terminus; the fluid passage being excluded, preventing substantial flow of fluid when installed in the cylindrical cavity.

The present invention relates to a modular architectural approach and its implementation to provide a system for enabling the sampling, conditioning, control, and distribution of fluids utilizing a standardized set of mounting blocks and interconnecting tubular elements, requiring no welds. It allows the design, assembly, installation, and maintenance of fluid control systems to be relatively inexpensive when compared to the conventional method of welding components together using metal piping.

The modular fluid distribution system receives chemical fluids at inlets and guides fluids into and out of conditioning and flow control components and delivers them to fluid analyzers or reactors such as those found in the chemical, petrochemical, pharmaceutical, and semiconductor industries. The fluid distribution system forms a modular substrate on which fluid processing components such as regulators, valves and, mass flow controllers are attached.

The invention emphasizes simplicity by covering a great majority of the requirements with as little as two types of mounting blocks and three cylindrical flow elements, while the general architecture allows for complexity as needed in the form of second level interconnection, custom interconnect elements for fluid inlet and outlet from the system, and mounting block variations in the number of lateral face connections and fluid routing options. The simplicity of the mounting block in the current modular approach allows complex systems to be designed and rapidly built without welding, specialized tools, or custom processes. Labor requirements are low in terms of specialized capability and complexity of task with minimum possibility of error.

BRIEF DESCRIPTION OF THE DRAWINGS

For a better understanding of the invention, reference should be made to the following detailed description taken in conjunction with the accompanying drawings, in which:

FIG. 4 depicts the structure of a mounting block for sequentially interconnecting two port components;

FIG. 5 depicts details of a two-port component seal interface and leak-testing feature of the invention;

FIG. 6 depicts details of a three-port component seal interface and leak-testing feature of the invention;

FIGS. 7 through 10 shows views of cylindrical flow elements;

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
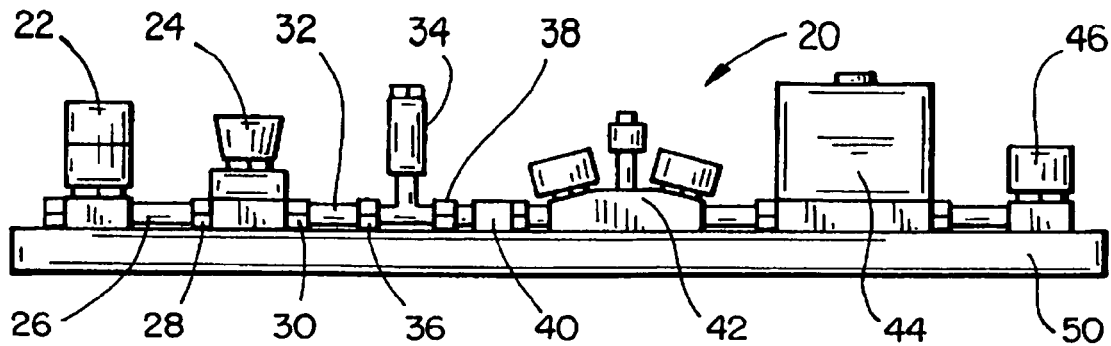
FIG. 1 illustrates prior art.
Figure 2:
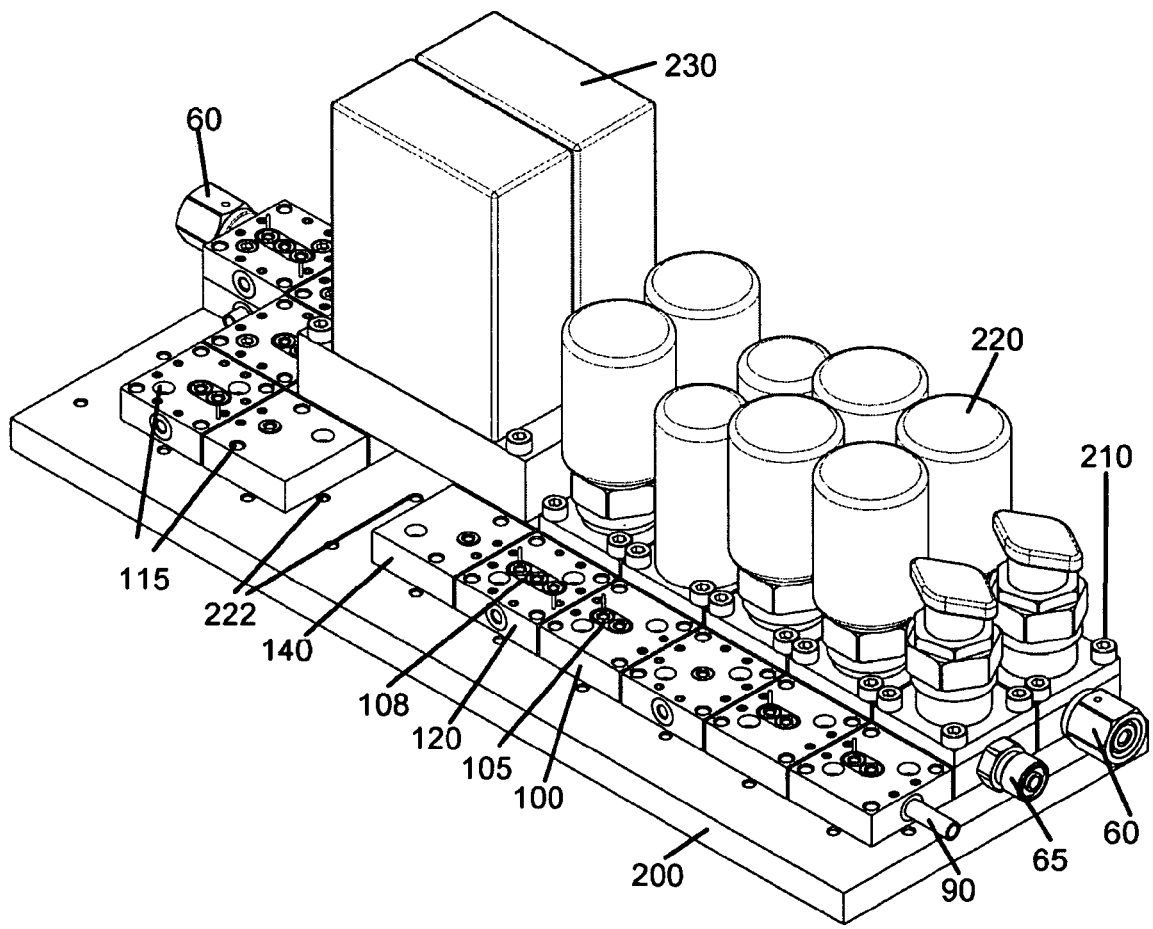
FIG. 2 illustrates a fluid control system utilizing the current invention.

FIG. 2 depicts a fluid control system composed of three linear arrays of blocks or "sticks" of components. The term "stick" is a term of art describing a linear array of fluid components sequentially interconnected performing a specific function as a whole, such as conditioning and controlling the amount of fluid to be delivered. Components affixed on the top surface of blocks using preferably male fasteners 210. For the purposes of illustration, components are not shown on one of the linear arrays and parts of the adjacent linear arrays. Components 220 and 230 are meant to illustrate valves, filters, pressure transducers, mass flow controllers, or any other fluidic control component. In the illustrated embodiment, fluid is introduced into the sticks by means of connectors 60 and 65, which are meant to be representative of industry-standard VCO connectors, or through a straight tube stub 90, built to allow the installation of industry-standard compression type connectors. Blocks 100, 120 and 140 have internal fluid passages allowing the routing of fluid to the components through ports 105 and 108 located on the top surface. Blocks have symmetrically opposing holes 115 allowing the use of preferably male fasteners 210 to attach blocks to mounting plate 200 using threaded holes 222. Blocks 100, 120 and 140 will be described subsequently.

Figure 3:
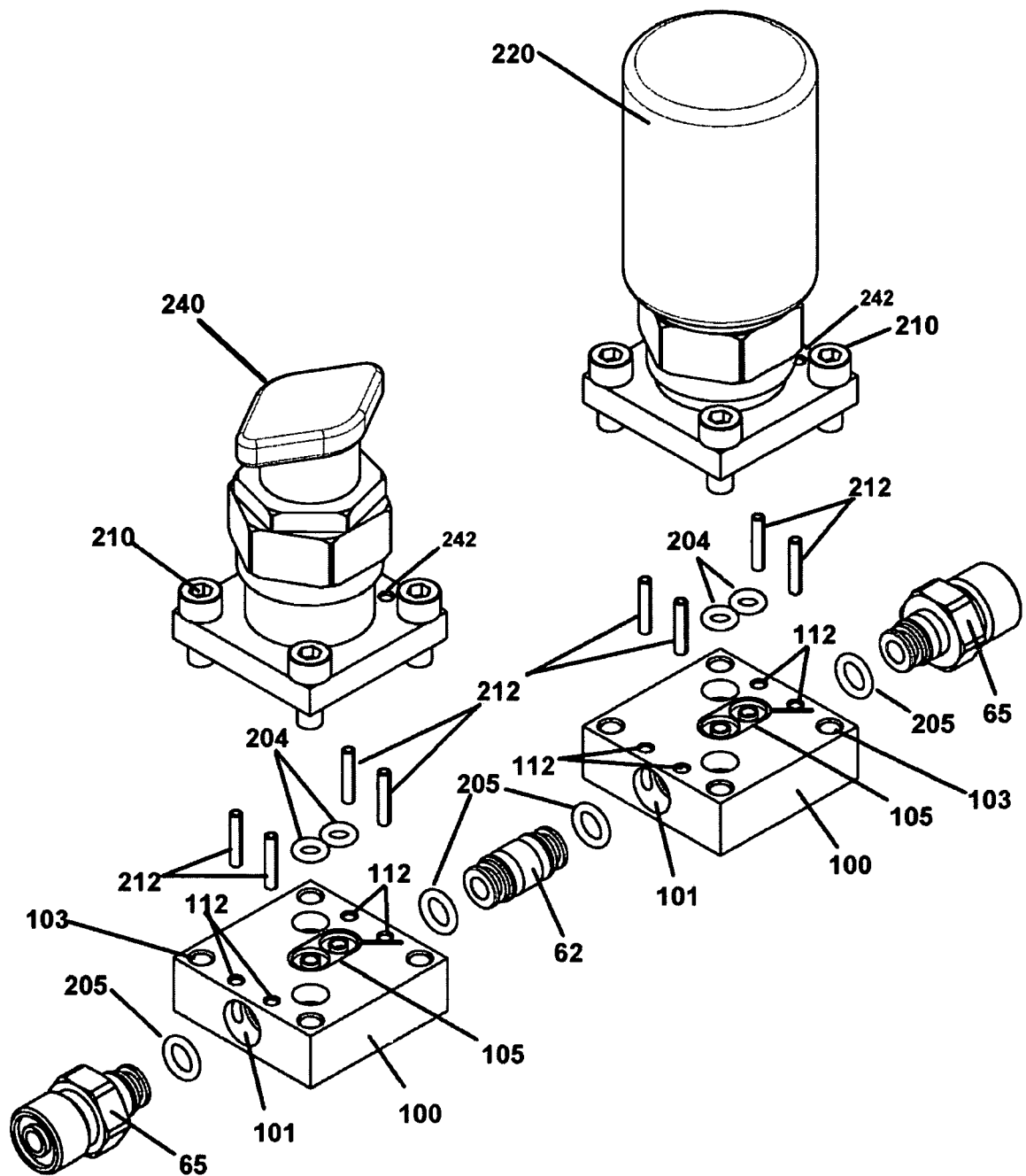
FIG. 3 is a view of sequentially interconnected fluidic control components using mounting blocks and cylindrical flow elements.

FIG. 3 further illustrates use of the invention to implement a functional stick containing a manual safety valve 240 and a pneumatically actuated valve 220. While only two components are shown in FIG. 3, the invention is meant to encompass any number of interconnected components arranged in a linear array or stick using blocks and cylindrical flow elements 62 as described herein. Fluid is introduced into and removed from the stick using VCO-type connectors 65. The opposite end to the VCO connector 65 is designed for insertion into the cylindrical cavity 101 formed into the lateral face of block 100. Fluid is kept from leaking by means of a seal 205, which is fabricated using an elastomeric material such as Viton, Kalrez or other commonly available sealing materials. The means by which the o-ring engages and forms a seal between the connector 65 and cylindrical flow element 62 can be achieved through numerous configurations. For instance, the o-ring can simply be compressed between the terminus of the cylindrical flow element 62 and the cylindrical cavity 101.

Figure 7:
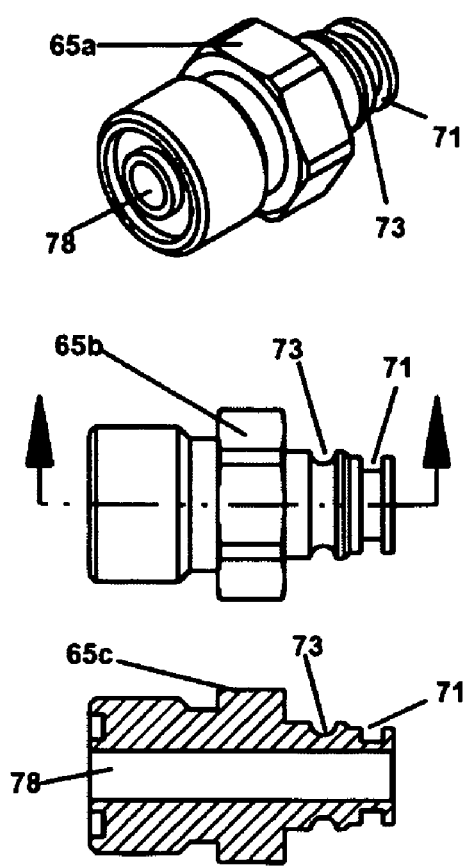
Figure 8:
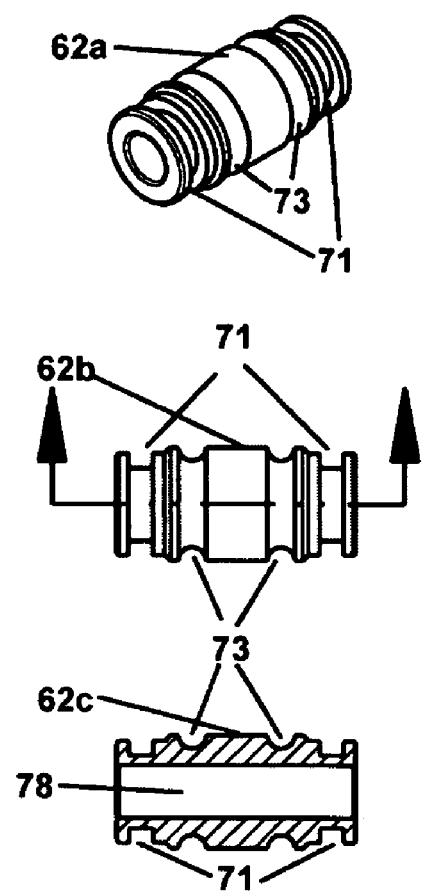

In another possible configuration, prior to insertion of connector 65 into a cylindrical cavity 101 formed on the face of block 100, seal 205 is placed on sealing annular groove 71 of connector 65 whose diameter is designed to slightly stretch seal 205 to keep it from slipping off during assembly. The diameter of cavity 101 in block 100 is sized to radially compress seal 205 by approximately 45% to 65% of its original radial thickness, this ratio being accepted by those skilled in the art as optimum for effective, durable hermetic sealing. Retaining groove 73 in connector 65 is used to keep connector 65 in place after insertion into cavity 101. Retaining groove 73, more readily seen in FIGS. 7 and 8, is designed to align vertically with holes 112 in block 100 so as to keep connector 65 from sliding out after insertion of dowel pins 212 into holes 112. Fluid flows through connector 65 through fluid passage 78 and into block 100.

It should be noted that the immediately preceding discussion of connector 65 using a VCO type of connection is applicable to any type of fluid connection used to bring fluid into the fluid control system. Another embodiment is shown in FIG. 9, which is meant to portray a tube stub suitable for use with commonly available compression connectors or for directly welding to a component or element capable of delivering fluid to the system. FIG. 10 displays various views of plug 80.

Block 100 contains a second cylindrical cavity similar to 101 on its posterior vertical face to allow routing of fluid between the two blocks. A cylindrical flow element 62 is used to route fluid between the blocks. Refer also to FIG. 8 containing isometric view 62a, side view 62b and cutout view 62c of cylindrical flow element 62. Fluid flows through fluid passage 78 from a first block 100 in FIG. 3 to a second block 100 in FIG. 3. Seals 205 are placed on feature 71 at both ends of cylindrical flow element 62 to keep fluid from leaking from the interconnection. Dowell pins 212 are used in conjunction with holes 112 and retaining groove 73 in cylindrical flow element 62.

Using passages internal to block 100, fluid is routed in and out of components 240 and 220 by means of ports 105. Seals 204 are used to form a hermetic connection with components, preventing fluid from leaking into the environment. Refer to FIG. 4 containing isometric view 110a, side view 100b and cutout view 100c of block 100. The front and back vertical faces of this block 100 contain cylindrical cavities 101 designed to mate with cylindrical flow element 62 as described previously. Fluid passages 109a and 109b route fluid to interconnect port 105, designed to accept and retain seals 204.

FIG. 5 illustrates the details of port 105. An important aspect of the invention is the capability to accept and retain seals 204 in order to facilitate mounting of various components, particularly when the fluid control system is mounted vertically or upside down. Annular cavity 117 and boss 118, designed to slightly stretch seals 204, make retaining of the seals possible. The depth of annular cavity 117 corresponds to the depth required to allow optimal compression of seals 204, when mated with components, for reliable and durable hermetic sealing. In addition, boss 118 keeps seals 204 from radially deforming over time towards their center, particularly in applications involving high temperature, which tends to accelerate deformation of elastomeric materials over time, degrading the reliability of fluid control systems.

Another aspect of the invention is the incorporation of cavity 111, which in conjunction with port 242, illustrated in FIG. 3, allows leak checking of each component interface. Checking for leaks may be accomplished by the use of a Helium detecting apparatus connected to all fluid inlets and outlets and inlets and placing all valves and fluid control devices in an open condition and causing a vacuum condition to occur in the fluid path. Helium is sequentially injected into cavity 111 through port 242 of each component while using the apparatus to determine the presence or absence of helium in the internal fluid paths. In order for leak checking to be effective at proving a hermetically sealed fluid path, helium must be placed in close proximity to each seal. Cavity 111 is designed to facilitate this process by routing helium gas all around seals 204. A defective seal will allow helium to leak into the internal fluid paths of the gas system and the helium detecting apparatus will show its presence. As seen in FIG. 6, cavity 111 can be utilized for the helium leak check method for ports 105 with multiple fluid inlets and outlets.

There are two symmetrically opposing holes 115 in block 100, shown in FIG. 4, which are used for mounting to a pre-drilled base plate (not shown). The diameter of these holes is made larger near the top surface of the block to allow for recessed mounting of male fasteners. Threaded holes 103 allow for components to be secured to each block utilizing male fastener.

Figure 11:
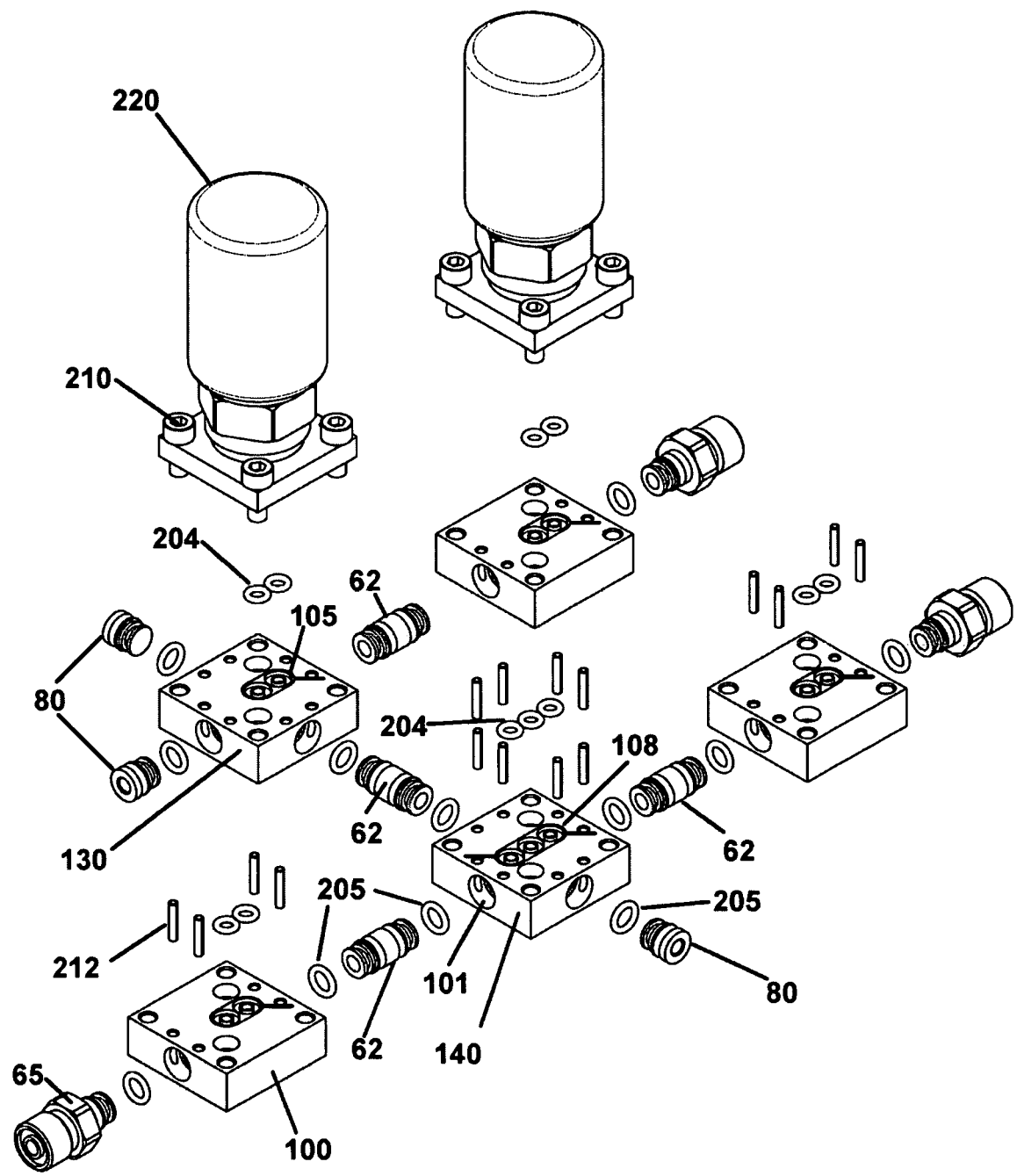
FIG. 11 is a view of interconnected fluidic control components using mounting blocks and fluidic control components illustrating flow splitting.

FIG. 11 further illustrates use of the invention to implement fluid interconnection between two fluid sticks. For clarity of illustration, most of the components are not shown, but the intended interconnecting embodiment of the invention encompasses any number of interconnecting and non-interconnecting sticks with varying numbers of blocks and components. Blocks 130 and 140 are designed so as to permit transverse interconnection across sticks, using a fluid path essentially perpendicular to the flow in each stick. Interconnection between sticks makes use of cylindrical flow element 62 and seals 205 in conjunction with fluid plugs 80 and blocks 130 and 140 incorporating fluid cavities 101a.

Figure 12:
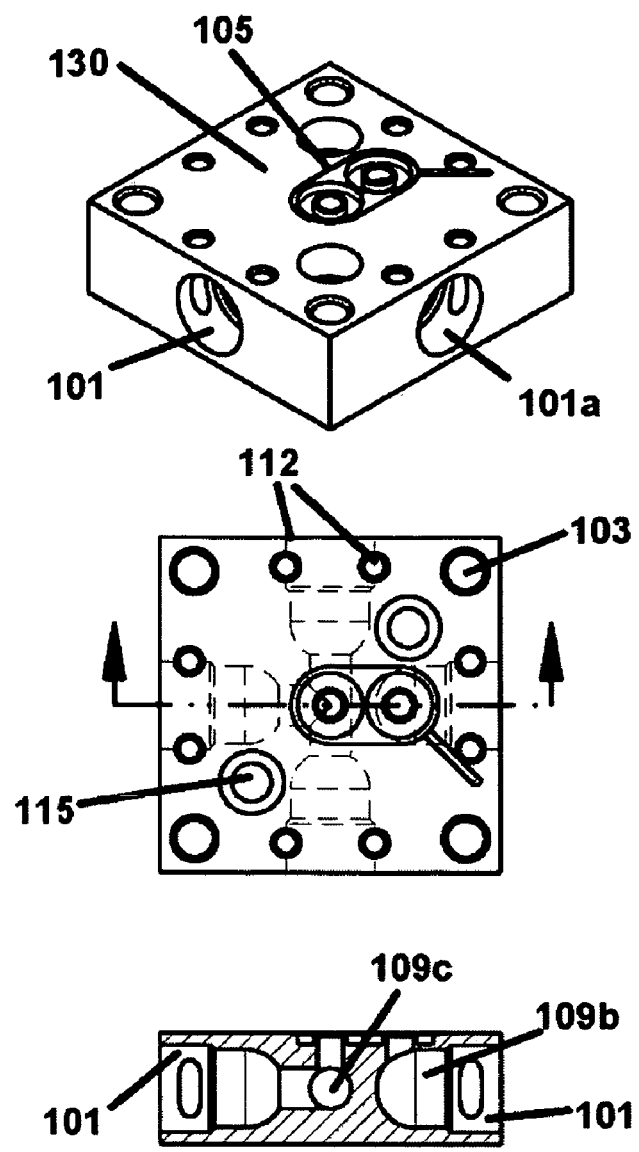
FIG. 12 depicts the structure of mounting blocks used in flow splitting.

Refer to FIG. 12, containing isometric, side, and cutout views of block 130 and showing cylindrical cavities 101a. Block 130 contains all the features previously described for block 100 shown in FIG. 4 as well as two additional, interconnected cylindrical cavities 101a, which are used to route fluid across sticks to or from a component mated to block 130.

Figure 13:
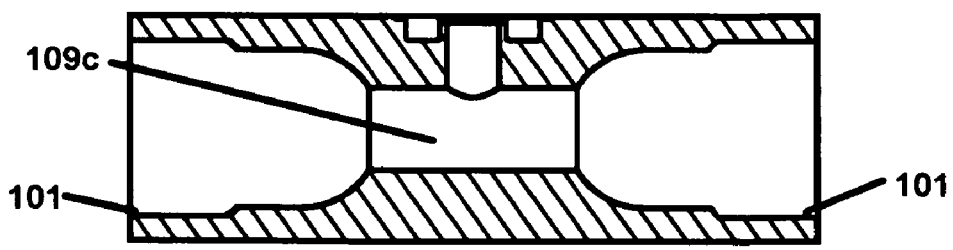
FIG. 13 depicts the structure of a mounting block with and perpendicular purge flow paths.

In order to purge the fluidic components without creating a secondary layer of mounting blocks, a purge flow path 101a can be seen in FIGS. 12 and 13. Looking at the top plan view and cross-sectional view of FIG. 12, the purge flow path 109c extending from cavity 101a intersects the fluid passage extending from cavity 101. This enables a purge flow to be introduced from an adjacent mounting block or other source on the same level as the mounting block shown. The purge flowing through passage 109c can be directed into a mounted fluidic component, not shown, purging the fluidic component, the purge exiting through passage 109b. FIG. 13 shows an additional, but normal cross section of FIG. 12, displaying the second fluid passage 109c, which intersects the first fluid passage 109a.

Figure 14:
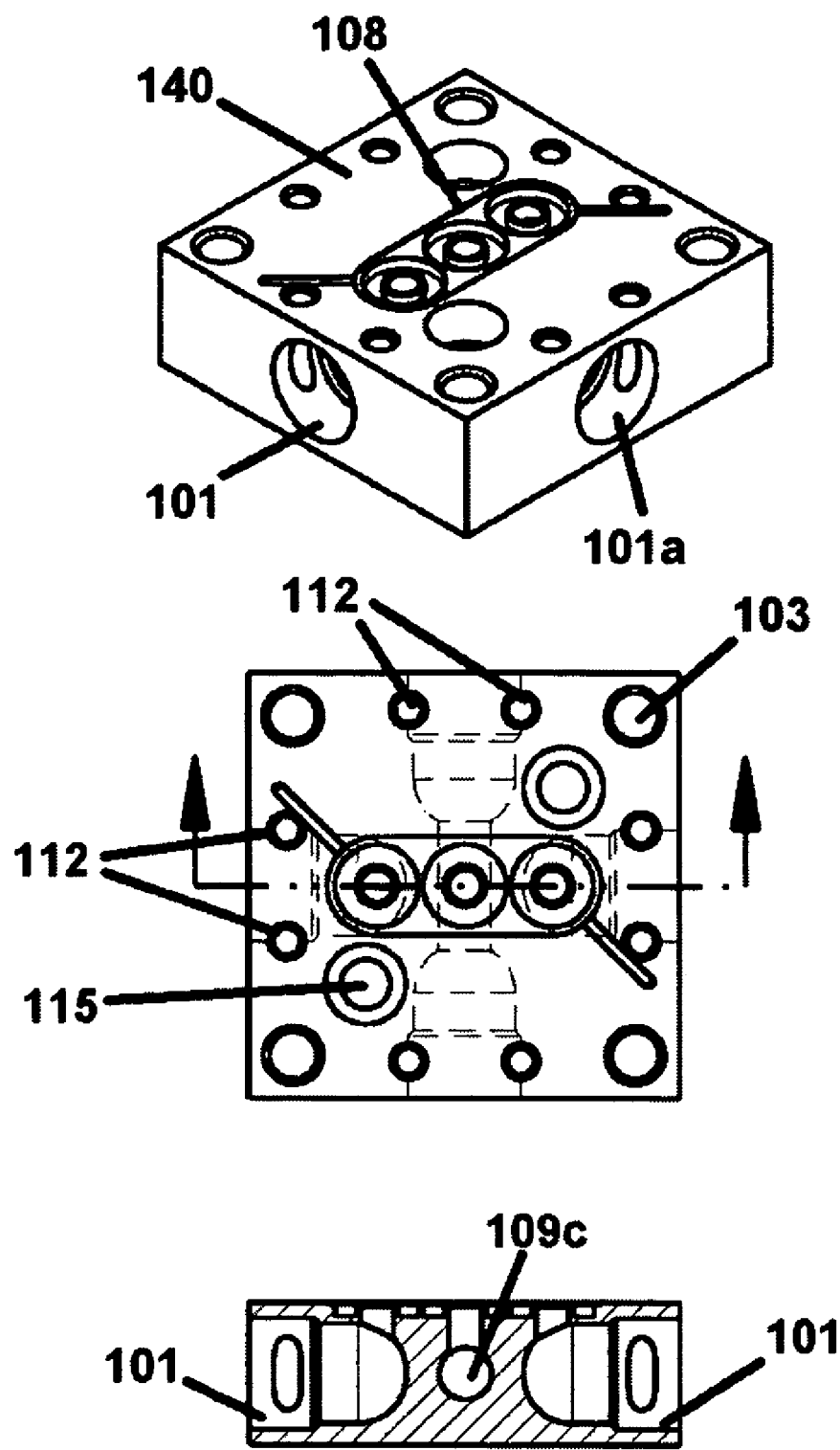
FIG. 14 shows views of a three-port mounting block, showing an independent purge flow passage normal to the primary fluid flow passage.

Block 130 contains all the features previously described for block 100 shown in FIG. 4 as well as two additional, separate cylindrical cavities 101a, which are used to route fluid across sticks to or from a component mated to block 130. Looking at FIG. 14, a second variation of the single level purge mounting block embodiment can be seen. The top face of the mounting block has three ports formed thereon. The right port and left port guide a process fluid in and out of a mounting fluidic component, fluid entering through passage 101. The fluidic component is configured with a third center fluid port for receiving a purge flow from isolated purge passage 109c. Again, a purge can be introduced to the fluidic component without creating a secondary layer of mounting blocks.

Figure 15:
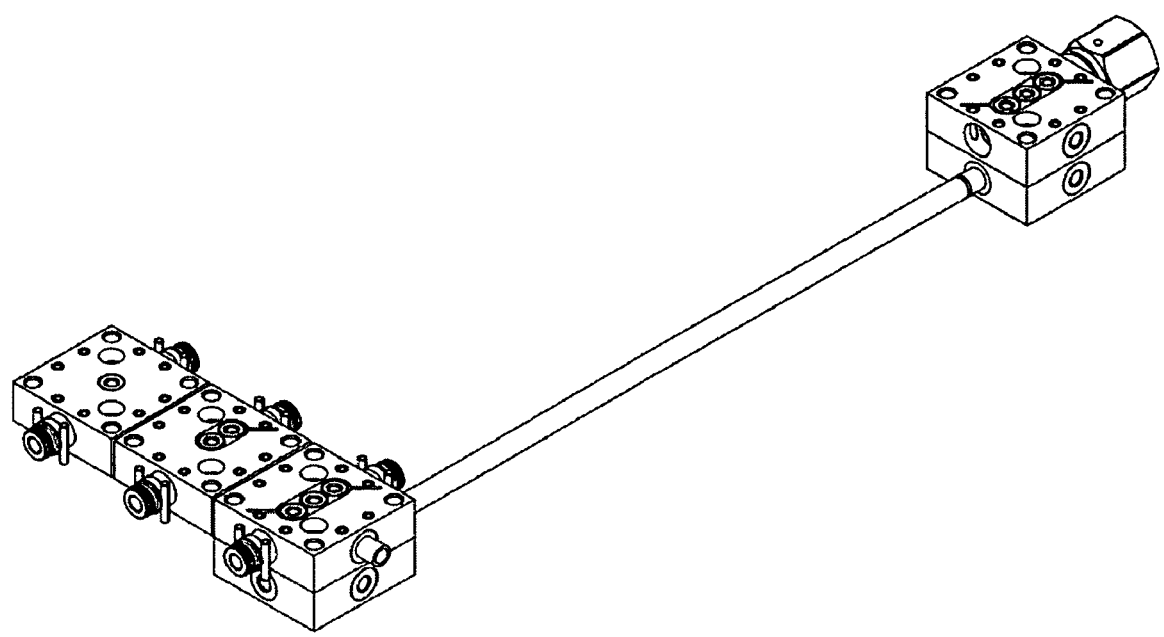
FIG. 15 depicts the structure of mounting blocks used in second level interconnection.

FIG. 15 shows a configuration where a second level of component mounting blocks is positioned directly beneath the primary assembly of component mounting blocks. This is one of the only embodiments that may require welding. A tube with one tubular element welded to each terminus connects two component mounting blocks on the second level; the primary assembly directly above the tube assembly has been visually removed for demonstration purposes. A purging fluid or any other desired fluid can be transported through this second level, to any desired component mounting block in the assembly, without the need to travel through components installed between the first and second component where fluid communication is desired. This elongated tubular element can be any length necessary.

While the present invention has been described with regards to particular embodiments, it is recognized that additional variations of the present invention may be devised without departing from the inventive concept.

Having thus described the invention, it is now claimed:

1. An interconnection assembly for the transport of a fluid between a plurality of mounting blocks of a modular fluid distribution system comprising:
   a first mounting block;
   a second mounting block, said first mounting block and said second mounting block both being configured to receive a fluid control component mounted directly thereon to a mounting face;
   an inlet cylindrical cavity, said inlet cylindrical cavity being formed through a first lateral face of said first mounting block and said second mounting block, each of said inlet cylindrical cavities having a wall and a bottom, a fluid port being formed at said bottom of each said cylindrical cavities;
   an outlet cylindrical cavity, said outlet cylindrical cavity being substantially similar to said inlet cylindrical cavity, said outlet cylindrical cavity being formed through a second lateral face of said first mounting block and said second mounting block;
   a cylindrical flow element, a fluid passage being formed through an axis of said cylindrical flow element, said cylindrical flow element having a first terminus and a second terminus, an annular retaining groove being formed on said outer surface of each said first terminus and said second terminus, an annular sealing groove being formed on said outer surface of each said first terminus and said second terminus;
   an annular sealing means, said annular sealing means being made of an elastomer material, one of said annular sealing means being seated in each said annular sealing groove formed on said first terminus and said second terminus;
   a plurality of discontiguous retaining pins, said discontiguous retaining pins being inserted through a corresponding plurality of holes formed in said first mounting block and said second mounting block, said annular retaining groove of said first terminus being configured to receive said discontiguous retaining pins when said first terminus of said cylindrical flow element is inserted into said outlet cylindrical cavity of said first mounting block, said annular retaining groove of said second terminus being configured to receive said discontiguous retaining pins when said second terminus of said cylindrical flow element is inserted into said inlet cylindrical cavity of said second mounting block;
   wherein said annular sealing means is compressed between said wall of said outlet cylindrical cavity of said first mounting block and its corresponding said annular sealing groove, and said annular sealing means being compressed between said wall of said inlet cylindrical cavity of said second mounting block and its corresponding said annular sealing groove, said annular sealing means forming a hermetic seal between said first mounting block, said fluid passage of said cylindrical flow element, and said second mounting block;
   and wherein said discontiguous retaining pins preventing substantial disengagement of said cylindrical flow element from said outlet cylindrical cavity and said inlet cylindrical cavity, said discontiguous retaining pins preventing substantial transmission of torque between said first mounting block and said second mounting block;
   and wherein said fluid is transported between said first mounting block and said second mounting block via said cylindrical flow element, one said cylindrical flow element coupling said first mounting block to said second mounting block.

2. An interconnection assembly for the transport of a fluid between a plurality of mounting blocks of a modular fluid distribution system comprising:
   an inlet cylindrical cavity, said inlet cylindrical cavity being formed through a first lateral face of a first mounting block and a second mounting block, each of said inlet cylindrical cavities having a wall and a bottom, a fluid port being formed at said bottom of each said cylindrical cavities;
   an outlet cylindrical cavity, said outlet cylindrical cavity being substantially similar to said inlet cylindrical cavity, said outlet cylindrical cavity being formed through a second lateral face of said first mounting block and said second mounting block;
   a cylindrical flow element, a fluid passage being formed through an axis of said cylindrical flow element, said cylindrical flow element having a first terminus and a second terminus, an annular retaining groove being formed on said outer surface of each said first terminus and said second terminus, an annular sealing groove being formed on said outer surface of each said first terminus and said second terminus;

an annular sealing means, said annular sealing means being made of an elastomer material, one of said annular sealing means being seated in each said annular sealing groove formed on said first terminus and said second terminus;

a plurality of retaining pins, said retaining pins being inserted through a corresponding plurality of holes formed in said first mounting block and said second mounting block, said annular retaining groove of said first terminus being configured to receive said retaining pins when said first terminus of said cylindrical flow element is inserted into said outlet cylindrical cavity of said first mounting block, said annular retaining groove of said second terminus being configured to receive said retaining pins when said second terminus of said cylindrical flow element is inserted into said inlet cylindrical cavity of said second mounting block;

a leak detection cavity, said leak detection cavity being formed in said mounting face, said inlet port and said outlet port being formed within said leak detection cavity, a groove being formed on said mounting face extending from a perimeter of said leak detection cavity, said groove being configured to receive a detection fluid through a detection orifice of said fluidic control component mounted thereon;

wherein said annular sealing means is compressed between said wall of said outlet cylindrical cavity of said first mounting block and its corresponding said annular sealing groove, and said annular sealing means being compressed between said wall of said inlet cylindrical cavity of said first mounting block and its corresponding said annular sealing groove, said annular sealing means forming a hermetic seal between said first mounting block, said fluid passage of said cylindrical flow element, and said second mounting block;

and wherein said retaining pins preventing substantial disengagement of said cylindrical flow element from said outlet cylindrical cavity and said inlet cylindrical cavity, said retaining pins preventing substantial transmission of torque between said first mounting block and said second mounting block;

and wherein said fluid is transported between said first mounting block and said second mounting block via said cylindrical flow element, one said cylindrical flow element coupling said first mounting block to said second mounting block.

* * * * *